United States Patent
Ranney et al.

(10) Patent No.: US 8,112,470 B2
(45) Date of Patent: Feb. 7, 2012

(54) VIRTUAL JAVASCRIPT OBJECT NOTATION

(75) Inventors: Jeffrey Ranney, Los Gatos, CA (US); Vladimir Dumitrean, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/207,046

(22) Filed: Sep. 9, 2008

(65) Prior Publication Data

US 2010/0076956 A1    Mar. 25, 2010

(51) Int. Cl.
*G06F 15/16* (2006.01)
*G06F 7/00* (2006.01)

(52) U.S. Cl. .................. 709/201; 709/202; 707/803

(58) Field of Classification Search .............. 707/736, 707/792, 802, 600, 601, 803, 805; 709/201, 709/202, 203, 217
See application file for complete search history.

(56) References Cited

U.S. PATENT DOCUMENTS

| | | | |
|---|---|---|---|
| 5,701,459 A | 12/1997 | Millett et al. | |
| 6,169,993 B1 * | 1/2001 | Shutt et al. | 717/108 |
| 6,615,253 B1 | 9/2003 | Bowman-Amuah | |
| 7,577,938 B2 * | 8/2009 | Bent et al. | 717/113 |
| 7,650,432 B2 * | 1/2010 | Bosworth et al. | 709/248 |
| 7,689,663 B2 | 3/2010 | Kinnan et al. | |
| 7,698,256 B1 * | 4/2010 | Wang | 709/203 |
| 7,827,160 B2 | 11/2010 | Kuhr et al. | |
| 2004/0139426 A1 | 7/2004 | Wu | |
| 2006/0047780 A1 | 3/2006 | Patnude | |
| 2006/0092055 A1 | 5/2006 | Baldwin et al. | |
| 2006/0235878 A1 | 10/2006 | Shipp et al. | |
| 2007/0061708 A1 | 3/2007 | Kothari et al. | |
| 2007/0078887 A1 | 4/2007 | Harvey et al. | |
| 2008/0010338 A1 | 1/2008 | Curtis et al. | |
| 2008/0034441 A1 | 2/2008 | Saha et al. | |
| 2009/0210781 A1 * | 8/2009 | Hagerott et al. | 715/234 |
| 2009/0299200 A1 * | 12/2009 | Eggenberger et al. | 600/508 |

OTHER PUBLICATIONS

Welterlin et al., "Presentation Layer Performance Tuning," printed from http://welterlin.net/whitepapers/PresentationLayerPerformanceTuning.pdf, Jun. 2007, 9 pages, Avenue A 1 Razorfish, US.
Jones, "Modular JSON/On-Demand JavaScript Interface," printed from http://www.glennjones.net/Post/808/ModularJSONOnDemandJavaScriptinterface.htm, Jan. 2006, 8 pages, Glenn JonesCreative, UK.
Gravelle, "An Introduction to JavaScript Object Notation (JSON)," printed from http://www.webreference.com/programming/javascript/rg5/, printed on Jul. 7, 2008, 4 pages, US.
Unknown, "AJAX Analysis: An Overview and Critique of Using XMLHTTPRequest in Client-Side Development," printed from http://www.dodeca.co.uk/aspectjs/a_AJAX_Analysis.htm, printed on Jul. 7, 2008, 7 pages, UK.

* cited by examiner

*Primary Examiner* — Tony Mahmoudi
*Assistant Examiner* — Md. I Uddin
(74) *Attorney, Agent, or Firm* — Senniger Powers LLP

(57) ABSTRACT

A client receives an object definition defining an object and an array of elements from a server. Each of the elements in the received array includes data representing objects associated with a data store of the server. The client instantiates a plurality of objects based on the received array and based on the received object definition. The objects are then accessed via a web application executing on the client.

10 Claims, 4 Drawing Sheets

VIRTUAL JAVASCRIPT OBJECT NOTATION

BACKGROUND

JavaScript is a scripting language often used for client-side web development. Although best known for its use in websites (as client-side JavaScript), JavaScript is also used to enable scripting access to objects embedded in other applications. The primary use of JavaScript is to write functions that are embedded in or included from HTML pages and interact with the Document Object Model (DOM) of the page. Other scripting languages include VBScript and ECMAScript. For example, scripting languages may be used to open or "pop up" a new window with programmatic control over the size, position and look of the new window or to validate web form input values before they are submitted to a server.

JSON, or JavaScript Object notation, is a general-purpose data interchange format that is defined as a subset of JavaScript. JSON is a text-based, human-readable format for representing simple data structures and associative arrays (called objects). The JSON format is often used for transmitting structured data over a network connection in a process called serialization. JSON is primarily used in Ajax web application programming, where it serves as an alternative to the use of the XML format. However, JSON requires that the fields or properties of an object are included with each object. The following is an example of a contact object in JSON format:

```
{ "contact": {
    "name": "Joe Smith",
    "email": "joe.smith@live.com",
    "IsFavorite": true,
    Etc...
    }
}}
```

Ajax (asynchronous JavaScript and XML), or AJAX, is a group of interrelated web development techniques used for creating interactive web applications or rich Internet applications. With Ajax, web applications can retrieve data from the server asynchronously in the background without interfering with the display and behavior of the existing page. Data is retrieved using the XMLHttpRequest object or through the use of Remote Scripting in browsers that do not support it. Despite the name, the use of JavaScript, XML, or asynchrony is not required.

SUMMARY

Aspects of the invention overcome one or more vulnerabilities associated with transferring objects in JSON format from a server to a client by separating the object definition from the object data. The object definition and the object data is sent to the client. The object data is formatted into an array of elements, one element for each data object. The client instantiates the objects based on the array of elements and the object definition. Once the objects are instantiated, they may be utilized by the client.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
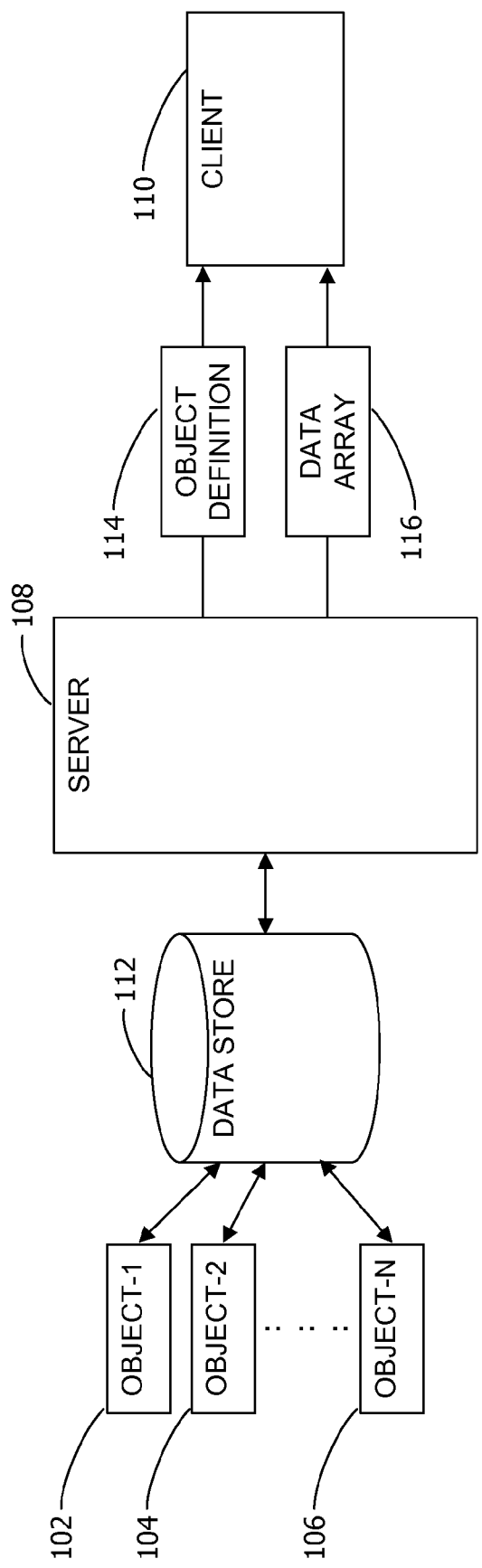
FIG. 1 is a block diagram illustrating one example of a suitable computing system environment in which the invention may be implemented.

In an embodiment, the invention includes transferring and instantiating virtual JavaScript objects from a server to a client. FIG. 1 is an exemplary block diagram illustrating an embodiment of a system for copying objects (e.g., object-1 102, object-2 104, and object-n 106) from a server 108 to a client 110. In an embodiment, the objects are JavaScript objects (JSON).

The client 110 receives an object definition 114 from the server 108. The received object definition 114 defines an object (e.g., object-1 102, object-2 104, and object-n 106) of a data store 112 associated with a server 108.

The client 110 receives an array 116 of elements from the server 108. Each of the elements in the received array 116 includes data representing the object (e.g., object-1 102, object-2 104, and object-n 106) associated with a data store 112. In an embodiment, the data is associated with a shared contacts store (e.g., data store 112) of an email server (e.g., server 108). Advantageously, the client 110 does not need to know the format of the object before the array 116 is received, because the object definition 114 is also received by the client 110 from the server 108. And, by separating the object definition 114 from the array 116 of data representing the objects (e.g., object-1 102, object-2 104, and object-n 106), there is no need to repeatedly send the object definition 114 with each object.

The client 110 instantiates a plurality of objects (e.g., object-1 102, object-2 104, and object-n 106) based on the received array 116 and based on the received object definition 114. Each of the plurality of objects (e.g., object-1 102, object-2 104, and object-n 106) corresponds to one of the elements in the received array 116. In an embodiment, the objects (e.g., object-1 102, object-2 104, and object-n 106) are accessed via a web application executing on the client 110.

In an embodiment, the array 116 is received by the client 110 from the server 108 in response to a request for a plurality of objects (e.g., object-1 102, object-2 104, and object-n 106) associated with a user. For example, the request may be generated by a script executing on the client 110. The executing script may also generate a web page display embedded with the instantiated plurality of objects on the client 110. In an embodiment, the executing script and generated web page may be part of the web application such as an AJAX web application.

In another embodiment, the client 110 receives a second array (e.g., array 116) of data representing a second plurality of objects (e.g., object-1 102, object-2 104, and object-n 106)

associated with a data store 112 from the server 108. The second plurality of objects are instantiated based on the received second array and based on the previously received object definition 114. Each object (e.g., object-1 102, object-2 104, and object-n 106) of the second plurality of objects) corresponds to an element in the second array. Advantageously, efficiency is increased because the client 110 has already received object definition 114 for the objects (e.g., object-1 102, object-2 104, and object-n 106) and, consequently, there is no need to resend the object definition 114.

In yet another embodiment, the object (e.g., object-1 102, object-2 104, and object-n 106) may be expanded beyond the received array using business logic when instantiating the objects. For example, a new object is created based on the received object definition 114. The object is comprised of a plurality of properties. The client 110 assigns a first value from the received array 116 to a first property of the object. And in turn, a second value is assigned to a second property of the object, the second value is a function of first property. Alternatively, the second value may be a function of a plurality of properties of the object, a defined constant, or derived from some other procedure executed by the client (i.e., a date function which returns the current date/time).

Figure 2:
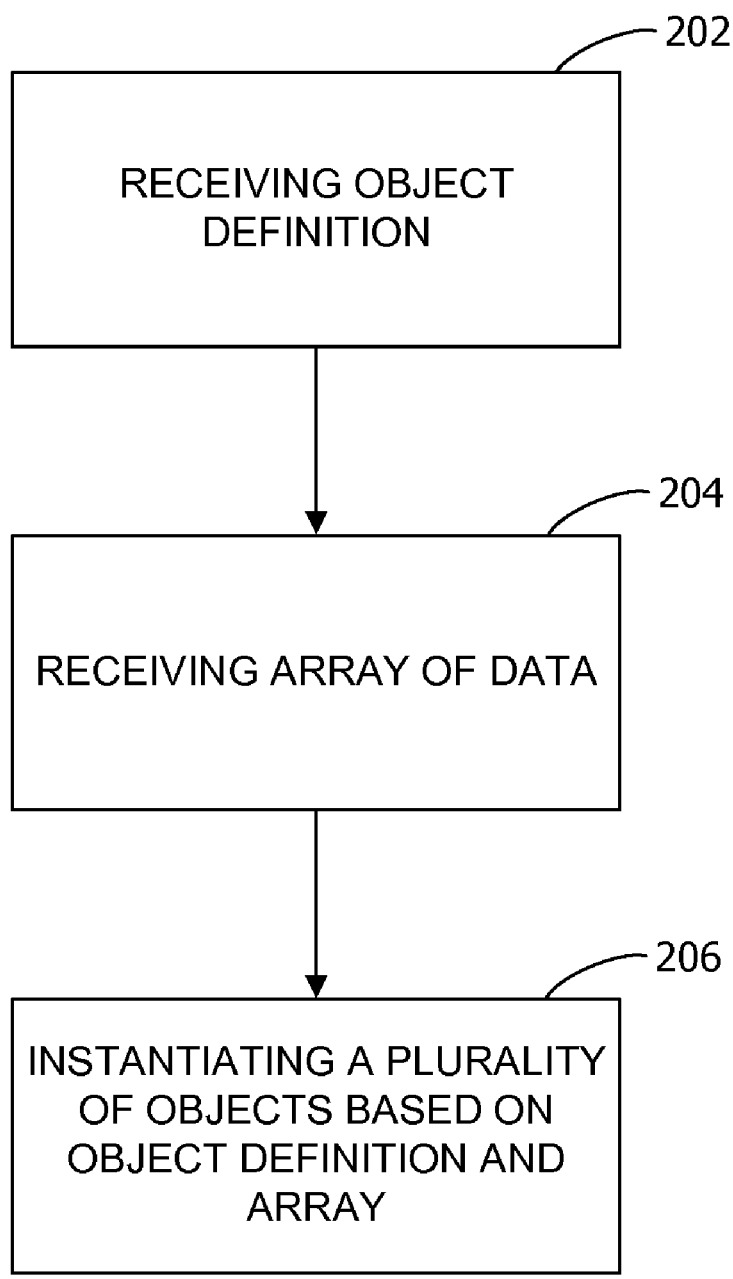
FIG. 2 is an exemplary flow diagram for a method for copying objects from a server to a client.

FIG. 2 illustrates an embodiment for copying objects (e.g., object-1 102, object-2 104, and object-n 106) from the server 108 to the client 110. At 202, the client 110 receives the object definition 114 from the server 108. The received object definition 114 defines the object (e.g., object-1 102, object-2 104, and object-n 108) of the data store 112 associated with the server 108. For example, the object definition 114 could exist in a separate JavaScript file. Alternatively, the object definition 114 could be included as a header of the array 116.

At 204, the client 110 receives the array 116 of elements from the server 108. Each of the elements in the received array 116 includes data representing the object (e.g., object-1 102, object-2 104, and object-n 108) associated with the data store 112.

At 206, the client 110 instantiates a plurality of objects (e.g., object-1 102, object-2 104, and object-n 108) based on the received array 116 and based on the received object definition 114. Each of the plurality of objects (e.g., object-1 102, object-2 104, and object-n 108) corresponds to one of the elements in the received array 116. The following is code sample of an object definition 114 used to instantiate a contact object:

```
// Client-side object backed by data from global array
var AbchElement = function AbchElement(abchClientID, isLightLoad,
emailIndex)
{
  var data = ContactPickerCore.contactData;
  if( data )
  {
    this.firstName = data[abchClientID][1];
    this.lastName = data[abchClientID][2];
    this.serverSideID = data[abchClientID][3];
    this.email = data[abchClientID][4];
  }
}
```

In an embodiment, the objects (e.g., object-1 102, object-2 104, and object-n 108) are accessed via a web application executing on the client 110.

Figure 3:
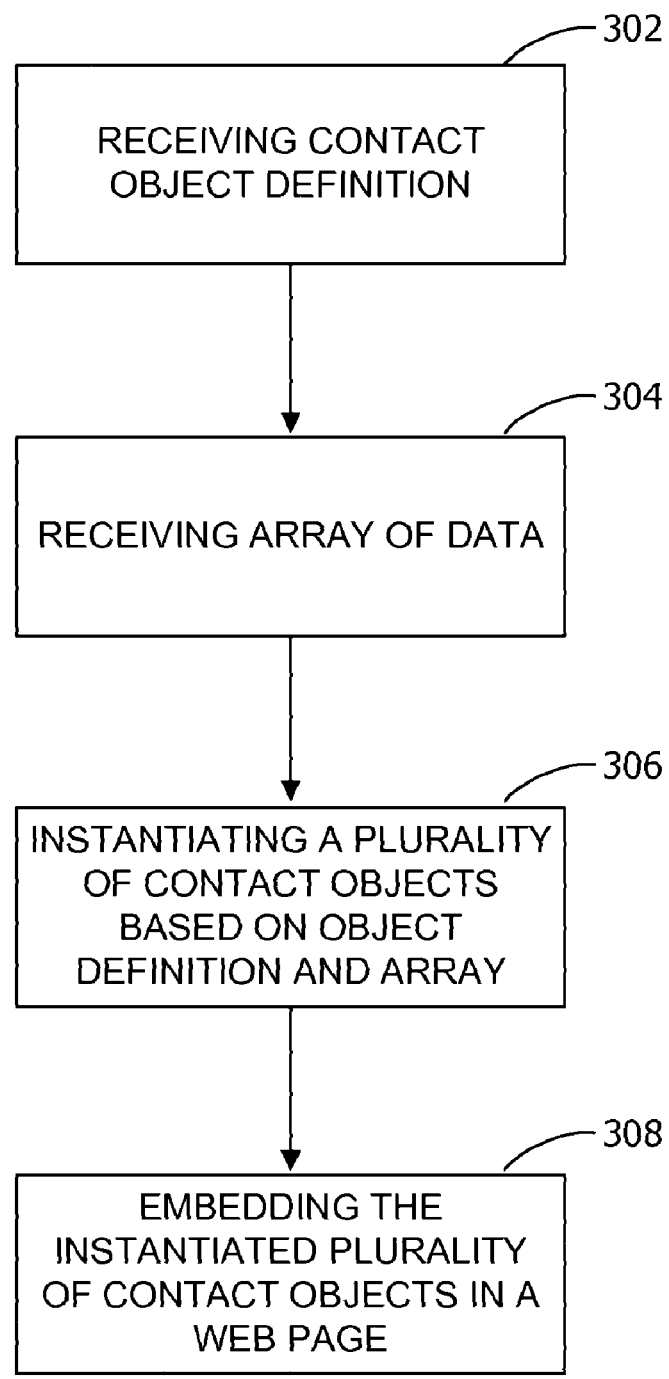
FIG. 3 is an exemplary flow diagram for a method for receiving contact objects from an email server.

FIG. 3 illustrates an embodiment of a method for receiving contact objects (e.g., object-1 102, object-2 104, and object-n 108) from an email server (e.g., server 108). At 302, the client 110 receives a contact object definition (e.g., object definition 114) from the email server in response to a request. In an embodiment, the request is generated by a script executing on the client 110. The contact object definition defines the contact object (e.g., object-1 102, object-2 104, and object-n 108) of the data store 112 associated with the email server. In an embodiment, the contact data objects are JavaScript objects.

At 304, the client 110 receives an array 116 from the email server (e.g., server 108). Each element in the array 116 includes data representing the contact object (e.g., object-1 102, object-2 104, and object-n 108) associated with the data store 112. The array 116 is received in response to the request for the plurality of contact objects associated with a user. For example, the following is a partial sample of an array of contact data objects:

```
var ContactPickerCore = { };ContactPickerCore.contactData = [
['a', '9580d406-bccf-4f51-acba-742bd913b283', '', 0, 0, 0,
['aguy\x26\x2364\x3bghotmail.com']],
['b', 'aaa6ae46-4d6f-4719-b3c2-fe6420178975', 'Benjamin', 0, 0, 0,
['Benjamin.Jones\x26\x2364\x3bghotmail.com','Ben.Jones\x26\x2364\
x3blive.com']],
['b', 'e0f12584-9a6e-4eec-b0b9-bc91829c4868', 'Benjamin Smith, 0, 0, 0,
['Benjamin.Smith\x26\x2364\x3bghotmail.com']], ...]
```

At 306, the client 110 instantiates the plurality of the contact objects (e.g., object-1 102, object-2 104, and object-n 108) based on the array and the contact object definition. Each contact object corresponds to an element in the array.

At 308, the client 110 embeds the instantiated plurality of contact objects (e.g., object-1 102, object-2 104, and object-n 108) in a web page. The client 110 renders the web page to the user. In an embodiment, the request and web page are part of an AJAX web application.

In another embodiment, the client 110 receives a second array (e.g., array 116) of data representing a second plurality of contact objects (e.g., object-1 102, object-2 104, and object-n 106) associated with the data store 112 from the email server (e.g., server 108). The second plurality of contact objects are instantiated based on the received second array and based on the previously received contact object definition (e.g., object definition 114). Each contact object (e.g., object-1 102, object-2 104, and object-n 106) of the second plurality of objects) corresponds to an element in the second array.

In yet another embodiment, the contact object (e.g., object-1 102, object-2 104, and object-n 106) may be expanded beyond the received array 116 using business logic when instantiating the contact objects. For example, a new contact object is creating based on the received contact object definition (e.g., object definition 114). The contact object is comprised of a plurality of properties. The client 110 assigns a first value from the received array 116 to a first property of the contact object. And in turn, a second value is assigned to a second property of the contact object, the second value is a function of first property. Alternatively, the second value may be a function of a plurality of properties of the contact object, a defined constant, or derived from some other procedure executed by the client (i.e., a date procedure which returns the current date/time).

The following is code sample of an object definition 114 including business logic used to instantiate a contact object:

```
// Client-side object backed by data from global array
var AbchElement = function AbchElement(abchClientID, isLightLoad,
emailIndex)
{
    var data = ContactPickerCore.contactData;
    if( data )
    {
        this.firstName = data[abchClientID][1];
        this.lastName = data[abchClientID][2];
        this.serverSideID = data[abchClientID][3];
        this.email = data[abchClientID][4];
// business logic...
        this.fullName = this.firstName + " " + this.lastName;
        this.isValid = (this.fullName != "" && this.email != "");
        this.isCategory = true;
    }
}
```

Figure 4:
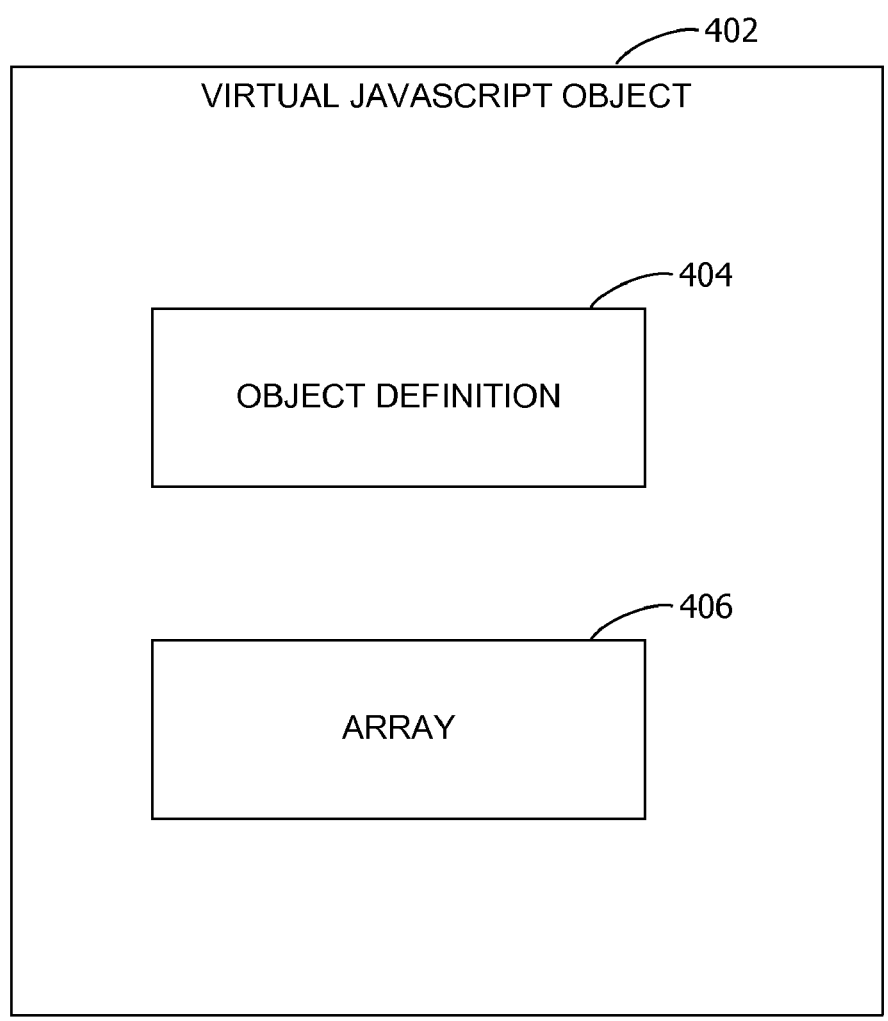
FIG. 4 is a block diagram illustrating an exemplary computer-readable storage medium on which aspects of the invention may be stored.

FIG. 4 is an embodiment of an exemplary block diagram of a computer readable storage medium defining a virtual JavaScript object 402. The virtual JavaScript object 402 includes an object definition 404 and an array 406. The object definition 404 defines a JavaScript object (e.g., object-1 102, object-2 104, and object-n 106) of a data store 112 associated with the server 108. Each element in the array 406 comprises data representing the JavaScript object associated with the data store 112. In an embodiment, the data is associated with a shared contacts store associated with an email server.

In response to receiving computer readable storage media defining the virtual JavaScript object 402, the client 110 executes instructions for instantiating a plurality of JavaScript objects (e.g., object-1 102, object-2 104, and object-n 106) based on the array 406 and the JavaScript object definition 404 of the received computer readable storage media 402. Each instantiated JavaScript object corresponds to an element in the array 402. In an embodiment, the instantiated plurality of JavaScript objects are embedded in the web page. And, the client 110 renders the web page to the user and the web page enables the user to search the plurality of embedded JavaScript objects. Alternatively, the request and web page are part of an AJAX web application Referring again to FIG. 1, FIG. 1 shows one example of a general purpose computing device in the form of a computer (e.g., server 108 and client 110). In one embodiment of the invention, a computer such as the server 108 and client 110 are suitable for use in the other figures illustrated and described herein. The computer (e.g., server 108 and client 110) has one or more processors or processing units and a system memory.

The computer (e.g., server 108 and client 110) typically has at least some form of computer readable media. Computer readable media, which include both volatile and nonvolatile media, removable and non-removable media, may be any available medium that may be accessed by computer (e.g., server 108 and client 110). By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., server 108 and client 110). Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. In the illustrated embodiment, system memory includes read only memory (ROM) and random access memory (RAM). A basic input/output system (BIOS), containing the basic routines that help to transfer information between elements within computer (e.g., server 108 and client 110), such as during start-up, is typically stored in ROM. RAM typically contains data and/or program modules that are immediately accessible to and/or presently being operated on by processing unit.

The computer (e.g., server 108 and client 110) may also include other removable/non-removable, volatile/nonvolatile computer storage media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The drives or other mass storage devices and their associated computer storage media discussed above and illustrated in FIG. 1, provide storage of computer readable instructions, data structures, program modules and other data for the computer (e.g., server 108 and client 110). In FIG. 1, for example, data store 112 is illustrated as storing data such as object-1 102, object-2 104, and object-n 106.

A user may enter commands and information into computer (e.g., server 108 and client 110) through input devices or user interface selection devices such as a keyboard and a pointing device (e.g., a mouse, trackball, pen, or touch pad). Other input devices (not shown) may include a microphone, joystick, game pad, satellite dish, scanner, or the like. These and other input devices are connected to processing unit through a user input interface that is coupled to system bus, but may be connected by other interface and bus structures, such as a parallel port, game port, or a Universal Serial Bus (USB). A monitor or other type of display device is also connected to system bus via an interface, such as a video interface.

The computer (e.g., server 108 and client 110) may operate in a networked environment using logical connections to one or more remote computers. The remote computer may be a personal computer, a server, a router, a network PC, a peer device or other common network node, and typically includes many or all of the elements described above relative to computer (e.g., server 108 and client 110). The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In a networked environment, program modules depicted relative to computer (e.g., server 108 and client 110), or portions thereof, may be stored in a remote memory storage device (not shown). The network connections shown are exemplary and other means of establishing a communications link between the computers may be used.

Generally, the data processors of computer (e.g., server 108 and client 110) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer (e.g., server 108 and client 110), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., server 108 and client 110) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method executable by a processor of a client device for receiving objects from a server, said processor configured to execute instructions for:

sending, by the client device, a first request to the server;

receiving, by the client device, an object definition from the server in response to the sent first request, said received object definition defining an object of a data store associated with a server separable from the defined object;

receiving, by the client device, a first array of elements from the server wherein each of the elements in the received first array includes data representing the object associated with a data store;

instantiating, by the client device, a first plurality of objects based on the received first array and based on the received object definition, each of the first plurality of objects corresponding to one of the elements in the received first array, wherein instantiating the first plurality of objects comprises:

creating, by the client device, a new object based on the received object definition, said object being comprised of a plurality of properties;

assigning, by the client device, a first value from the received first array to a first property of the new object; and assigning, by the client device, a second value to a second property of the new object wherein the second value is a function of first property;

sending, by the client device, a second request to the server different from the first request;

receiving, by the client device, a second array of elements different from the first array of elements from the server and in response to the sent second request; and instantiating, by the client device, a second plurality of objects based on the received second array and based on the previously received object definition, each of the second plurality of objects corresponding to one of the elements in the received second array.

2. The method of claim 1, wherein the objects are JavaScript objects.

3. The method of claim 1, wherein the data is associated with a shared contacts store of an email server.

4. The method of claim 1, wherein the first request and the second request are generated by a script executing on the client, said script being part of a web application.

5. The method of claim 4, wherein the executing script generates a web page display on the client and wherein the instantiated first and second plurality of objects are embedded in said web page, said web page being part of the web application.

6. The method of claim 1, wherein the web application is an AJAX web application.

7. A computerized method of a client device for receiving contact objects from an email server, said client device having a processor configured for executing instructions for:
    receiving, by the client device, contact object definition from the email server in response to a request, said contact object definition defining a contact object of a data store associated with the email server;
    receiving, by the client device, a first array from the email server wherein each element in the received first array includes data representing the contact object associated with the data store wherein the first array is received in response to a request for a plurality of contact objects associated with a user;
    instantiating, by the client device, a first plurality of the contact objects based on the received array and based on the received contact object definition, each contact object corresponding to one of the elements in the received first array, wherein the instantiating the first plurality of contact objects comprises:
        creating, by the client device, a new contact object based on the contact object definition, said contact object being comprised of a plurality of properties;
        assigning, by the client device, a first value from the first array to a first property of the new contact object; and
        assigning, by the client device, a second value to a second property of the new contact object wherein the second value is a function of a plurality of properties of the new contact object including the first property;
    receiving, by the client device, a second array of elements different from the first array of elements from the server; and
    instantiating, by the client device, a second plurality of objects based on the received second array and based on the previously received contact object definition, each of the second plurality of objects corresponding to one of the elements in the received second array; and
    embedding, by the client device, the instantiated first plurality of contact objects and the instantiated second plurality of objects in a web page wherein the web page is rendered to the user.

8. The method of claim 7, wherein the contact data objects are JavaScript objects.

9. The method of claim 7, wherein the request is generated by a script executing on the client.

10. The method of claim 7, wherein the request and the web page are part of an AJAX web application.

\* \* \* \* \*